(12) United States Patent
Djordjevic et al.

(10) Patent No.: US 9,470,914 B1
(45) Date of Patent: Oct. 18, 2016

(54) ELECTRO-REFRACTION MODULATOR WITH A REGROWN P-N JUNCTION

(71) Applicant: Oracle International Corporation, Redwood City, CA (US)

(72) Inventors: Stevan S. Djordjevic, San Diego, CA (US); John E. Cunningham, San Diego, CA (US); Ashok V. Krishnamoorthy, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/807,664

(22) Filed: Jul. 23, 2015

(51) Int. Cl.
*G02F 1/335* (2006.01)
*G02F 1/025* (2006.01)
*G02F 1/225* (2006.01)
*G02F 1/015* (2006.01)
*G02F 1/21* (2006.01)

(52) U.S. Cl.
CPC .............. *G02F 1/025* (2013.01); *G02F 1/2257* (2013.01); *G02F 2001/0153* (2013.01); *G02F 2001/0154* (2013.01); *G02F 2001/212* (2013.01)

(58) Field of Classification Search
CPC .......................... G02B 6/125; G02F 2001/152
See application file for complete search history.

(56) References Cited

U.S. PATENT DOCUMENTS

| | | | |
|---|---|---|---|
| 2015/0226987 A1* | 8/2015 | Park ....................... | G02B 6/125 385/2 |
| 2016/0080844 A1* | 3/2016 | Jones ................. | H04Q 11/0071 398/49 |

* cited by examiner

*Primary Examiner* — Sung Pak
*Assistant Examiner* — Hoang Tran
(74) *Attorney, Agent, or Firm* — Park, Vaughan, Fleming & Dowler LLP (57) ABSTRACT

An electro-refraction modulator includes a series of layers with different doping levels surrounding a single-crystal regrown p-n junction implemented in a silicon-on-insulator (SOI) technology. The regrown p-n junction is spatially abrupt and precisely defined, which significantly increases the tuning efficiency of the electro-refraction modulator while maintaining acceptable insertion loss. Consequently, the electro-refraction modulator (such as a resonator modulator or a Mach-Zehnder interferometer modulator) can have high bandwidth, compact size and reduced drive voltage. The improved performance of the electro-refraction modulator may facilitate silicon-photonic links for use in applications such as wavelength-division multiplexing.

20 Claims, 9 Drawing Sheets

ELECTRO-REFRACTION MODULATOR WITH A REGROWN P-N JUNCTION

GOVERNMENT LICENSE RIGHTS

This invention was made with United Stated Government support under Agreement No. HR0011-08-9-0001 awarded by the Defense Advanced Research Projects Administration (DARPA). The United States Government has certain rights in the invention.

BACKGROUND

1. Field

The present disclosure relates to techniques for modulating optical signals. More specifically, the present disclosure relates to an electro-refraction modulator with a single-crystal regrown p-n junction.

2. Related Art

Silicon photonics is a promising technology that can provide large communication bandwidth, low latency and low power consumption for inter-chip and intra-chip optical interconnects or links. A key component for use in inter-chip and intra-chip optical interconnects is a modulator that can be monolithically integrated into the same silicon layer as transistors and other optical components.

Existing modulator architectures, such as a ring-resonator modulator and Mach-Zehnder interferometer (MZI) modulator, typically use interference and phase control to achieve the modulation effect. In particular, the tuning efficiency of a ring-resonator modulator (in pm/V) or the required length (L) of the MZI modulator (such as the product of L needed for a 180° phase shift) are usually important considerations that relate to the energy efficiency and the size of the modulators, thus helping to define the integration potential of the modulators. In general, the energy efficiency and the size are directly related to the design of the phase-shifting section of a modulator.

Because electro-optical (EO) effects in single-crystal silicon are often relatively weak (compared to, for example, those in gallium arsenide and lithium-niobate), historically phase shifting in silicon was accomplished either by a thermo-optic effect (such as by integrating micro-heating elements in or proximate to a modulator) and/or by a free-carrier dispersion effect (e.g., by integrating a forward-biased p-i-n junction in a modulator). However, both of these approaches are inadequate for high-speed modulators, because of their limited bandwidth (typically in kiloHertz range for thermal tuning and up to a few gigaHertz for carrier injection, unless CMOS-unfriendly pre-emphasized signals are used at a cost of more energy per bit).

Consequently, photonic designers often use reverse-biased p-n junctions as the phase-shifting elements. These devices use the widening of the depletion zone of the p-n junction as a function of the applied reverse bias to modify the effective index of refraction of the optical waveguide in a modulator and, thus, to control the phase. Calculated initial and modulated widths of a p-n junction depletion zone as a function of the doping level (with equal donor and acceptor species) and the reverse bias voltage are summarized in Table 1.

TABLE 1

| Doping level $(cm^{-3})$ | Depletion region width (nm) at 0 V | Depletion region width (nm) at −1 V | Depletion region width (nm) at −2 V |
| --- | --- | --- | --- |
| $1 \cdot 10^{17}$ | 145.1 | 216.6 | 273.3 |
| $5 \cdot 10^{17}$ | 70.0 | 100.6 | 124.0 |
| $1 \cdot 10^{18}$ | 49.1 | 70.7 | 88.2 |
| $5 \cdot 10^{18}$ | 23.4 | 32.8 | 40.1 |
| $1 \cdot 10^{19}$ | 16.5 | 23.0 | 28.5 |

Using reverse-biased p-n junctions, modulators with bandwidths greater than 50 GHz have been obtained. However, the phase change achievable using a reverse-biased p-n junction is typically smaller than that obtainable using thermal tuning or carrier injection in comparably sized modulator. Consequently, MZI modulators that include reverse-biased p-n junctions usually require several millimeters of length in order to achieve a 180° phase change.

Similarly, ring-resonator modulators with reverse-biased p-n junctions would also benefit from increased tuning efficiency. Table 2 provides calculated phase-tuning efficiency and absorption-induced loss of lateral (or horizontal) and vertical p-n junctions as a function of the doping level (with equal donor and acceptor species). These calculations use a 300 nm thick silicon-on-insulator technology, with a 220 nm etch depth for optical waveguide definition and a 380 nm wide, single-mode optical waveguide.

TABLE 2

| Doping level $(cm^{-3})$ | Lateral junction tuning efficiency (pm/V) | Vertical junction tuning efficiency (pm/V) | Absorption-induced propagation loss (dB/cm) |
| --- | --- | --- | --- |
| $1 \cdot 10^{17}$ | 7.99 | 10.45 | 0.38 |
| $5 \cdot 10^{17}$ | 17.98 | 56.58 | 2.64 |
| $1 \cdot 10^{18}$ | 43.87 | 85.65 | 16.60 |
| $5 \cdot 10^{18}$ | 82.23 | 119.25 | 96.31 |
| $1 \cdot 10^{19}$ | 109.38 | 191.41 | 416.87 |

As shown in Table 2, the achievable tuning efficiency increases monotonously and sharply (roughly exponentially) with increased doping levels. However, higher doping levels result in a significant increase in the absorption-induced optical waveguide propagation loss. Therefore, for practical applications, designers typically limit the doping to less than $2 \cdot 10^{18}/cm^3$, which, as noted previously, results in millimeter-length MZI modulators. Moreover, ring-resonator modulators usually sacrifice the Q-factor for increased tuning efficiency because of the increased propagation loss.

Furthermore, the limited tuning efficiencies of existing modulators often result in the use of higher drive voltages. For example, existing modulators typically use drive voltages of more than 2 V. As CMOS technology nodes scale to smaller critical dimensions (and, thus, to higher optical data rates), the drive voltage decreases, which can reduce the performance of modulators.

Hence, what is needed is a modulator without the above-described problems.

SUMMARY

One embodiment of the present disclosure provides an integrated circuit. This integrated circuit includes: a substrate; a buried-oxide (BOX) layer disposed on the substrate; and a semiconductor layer, where the semiconductor layer includes an optical modulator. The optical modulator includes an instance of a stack including: an outer n-type layer having a minimum n-type doping level, an intermediate n-type layer having an intermediate n-type doping level that is greater than the minimum n-type doping level, a junction n-type layer having a maximum n-type doping level that is greater than the intermediate n-type doping level, a junction p-type layer having a maximum p-type doping level, an intermediate p-type layer having an intermediate p-type doping level that is less than the maximum p-type doping level, and an outer p-type layer having a minimum p-type doping level that is less than the intermediate p-type doping level. Moreover, a given layer in the instance of the stack is defined using single-crystal regrowth of the semiconductor layer.

Note the optical modulator includes a resonator modulator and/or a Mach-Zehnder modulator. For example, the resonator modulator may include: a ring-resonator modulator, a disc-resonator modulator, and/or a photonic-crystal resonator modulator.

Moreover, a thickness of a p-n junction between the junction n-type layer and the junction p-type layer may be smaller than a diameter of an optical mode in an optical waveguide in the semiconductor layer.

Furthermore, the semiconductor layer may include multiple instances of the stack.

Additionally, the instance of the stack may be along a vertical direction perpendicular to a plane of the semiconductor layer. Alternatively, the instance of the stack may be along a horizontal direction in a plane of the semiconductor layer.

In some embodiments, the instance of the stack has a V shape.

Note that the instance of the stack may be defined without ion implantation.

Moreover, boundary regions between pairs of layers in the instance of the stack may have a precision of less than five atomic planes.

Furthermore, the maximum n-type doping level and the maximum p-type doping level may be approximately $10^{19}/cm^3$, and the minimum n-type doping level and the minimum p-type doping level may be approximately $10^{17}/cm^3$.

Another embodiment provides a system that includes: a processor; a memory that stores a program module; and the integrated circuit. During operation, the program module is executed by the processor.

Another embodiment provides a method for modulating an optical signal, which may be performed by the integrated circuit.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Table 1 provides calculated initial and modulated widths of a p-n junction depletion zone as a function of the doping level and the reverse bias voltage.

Table 2 provides calculated phase-tuning efficiency and absorption-induced loss of lateral and vertical p-n junctions as a function of the doping level.

Note that like reference numerals refer to corresponding parts throughout the drawings. Moreover, multiple instances of the same part are designated by a common prefix separated from an instance number by a dash.

DETAILED DESCRIPTION

Embodiments of an electro-refraction modulator, an integrated circuit that includes the modulator, a system that includes the integrated circuit, and a method for modulating an optical signal are described. The electro-refraction modulator includes a series of layers with different doping levels surrounding a single-crystal regrown p-n junction implemented in a silicon-on-insulator (SOI) technology. The regrown p-n junction is spatially abrupt and precisely defined, which significantly increases the tuning efficiency of the electro-refraction modulator while maintaining acceptable insertion loss. Consequently, the electro-refraction modulator (such as a resonator modulator or a Mach-Zehnder interferometer or MZI modulator) can have high bandwidth, compact size and reduced drive voltage. The improved performance of the electro-refraction modulator may facilitate silicon-photonic links for use in applications such as wavelength-division multiplexing.

We now describe embodiments of the electro-refraction modulator (which is sometimes referred to as a 'modulator' or an 'optical modulator'). By decoupling high doping levels from the accompanying high absorption loss, the modulator can include highly doped p-n junctions, thereby enabling high-tuning efficiency without prohibitive losses. In particular, as shown in Table 1, with a doping level of $1 \times 10^{19}/cm^3$, the width of the depletion zone varies from approximately 15 nm unbiased to approximately 30 nm with $-2V$ bias. This depletion region, which is less than 10% of the volume of the optical waveguide in the modulator, is the 'workhorse' of the modulator. In contrast, the remainder of the optical waveguide cross-section does not contribute to the modulation, but does substantially contribute to the absorption loss. Therefore, an ideal modulator would only have high doping (p+ and n+) forming the p-n junction, while the remainder of the optical waveguide volume would be filled with a material having a smaller doping level.

However, this goal typically cannot be achieved using existing techniques for defining p-type and p-type regions (such as ion implantation). This is because high-energy ions, which are typically implanted with 20-200 keV, often straggle both in vertical and lateral or horizontal directions, which results in a bell-shaped spatial distribution of the dopants. In other words, making thin and abrupt layers with different doping levels is usually not possible. In addition, fabricating a large number of layers is often cost-prohibitive.

In order to address this problem, an electro-refraction modulator uses single-crystal regrowth techniques (instead of ion implantation) to define vertical p-n junctions. For example, the vertical single-crystal regrown p-n junctions may be fabricated using metalorganic chemical vapor deposition (MOCVD, which is sometimes referred to as 'MOVPE' and 'OMVPE'), molecular beam epitaxy (MBE) and similar epitaxial regrowth fabrication techniques. In an exemplary embodiment, silicon single-crystal regrown p-n junctions are fabricated using chemical vapor deposition (CVD) or ultra-high-vacuum CVD. Because ion-implantation regions can be patterned, while single-crystal growth usually takes place on the entire wafer, selective-area regrowth may be used to define a p-n junction on a SOI wafer, while keeping the rest of the SOI wafer undoped (for passive optical waveguides and other devices). Note that the electro-refraction modulator may include or may be based on: a band-filling effect, an electro-optic (EO) effect, a carrier-plasma dispersion effect and/or a Kerr (and, more generally, a quadratic EO) effect.

Figure 1:
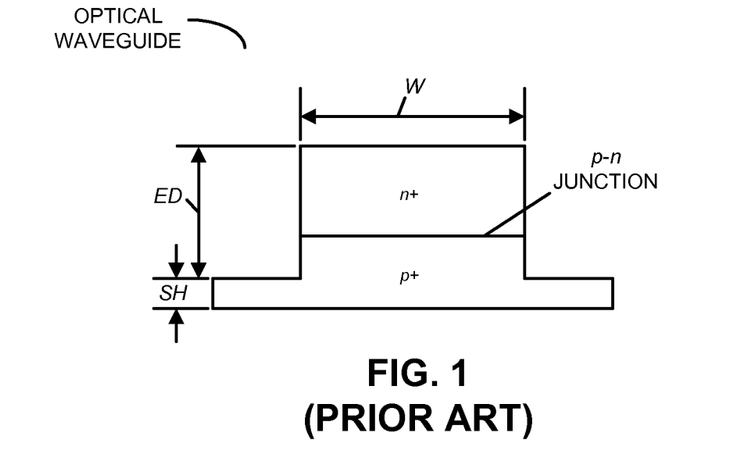
FIG. 1 is a block diagram illustrating a side view of an existing vertical p-n junction in an optical waveguide.

FIG. 1 presents a block diagram illustrating a side view of an existing vertical p-n junction (which is fabricated using ion implantation) in an optical waveguide. Note the characteristic dimensions of the SOI optical waveguide, including the width (W), the etch depth (ED) and the slab height (SH). In existing vertical p-n junctions, doping levels are typically chosen as compromise or trade-off between the tuning efficiency and the absorption-induced insertion loss. For example, the doping levels may be approximately $10^{18}/cm^3$. The regions with these 'medium-high' doping levels are indicated as p+ and p+ in FIG. 1.

Figure 2:
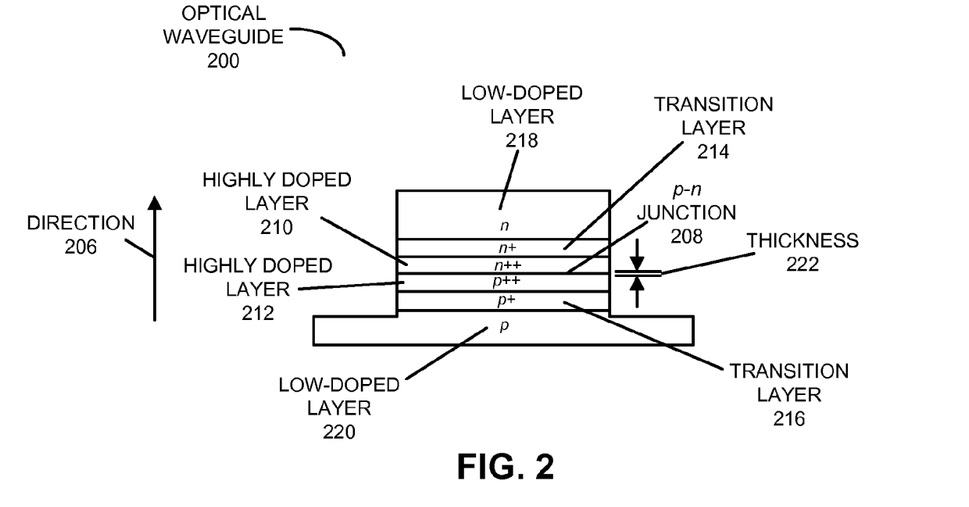
FIG. 2 is a block diagram illustrating a side view of a single-crystal regrown vertical p-n junction in an optical waveguide in accordance with an embodiment of the present disclosure.

As shown in FIG. 2, which presents a block diagram illustrating a side view of a single-crystal regrown vertical p-n junction 208 (which is sometimes referred to as a 'stack') in optical waveguide 200, the disclosed p-n junction may be formed by highly doped layers 210 and 212 indicated by p++ (which is sometimes referred to as a 'junction p-type layer') and n++ (which is sometimes referred to as a 'junction n-type layer'), with doping levels of approximately $10^{19}/cm^3$ or larger. (Note that vertical p-n junction 208 may be along a vertical direction 206 perpendicular to a plane of a semiconductor layer in an SOI wafer.) However, as indicated by the calculations in Table 1, these highly doped layers do not need to be thicker than 30-40 nm, and a thickness 222 of p-n junction 208 between doped layers 210 and 212 may be smaller than a diameter of an optical mode in optical waveguide 200.

Moreover, p-n junction 208 may include thin transition layers 214 and 216 (which may be on the order of 20-30 nm thick), with a p+ doping level (which is sometimes referred to as an 'intermediate p-type layer') and an n+ doping level (which is sometimes referred to as an 'intermediate n-type layer'), which are used to sandwich highly doped layers 210 and 212. Furthermore, the remainder of the optical waveguide cross-section may be filled with low-doped layers 218 and 220 (with doping levels of approximately $10^{17}/cm^3$ or lower), which are denoted by p (which is sometimes referred to as an 'outer p-type layer') and n (which is sometimes referred to as an 'outer n-type layer'). In some embodiments, boundary regions between pairs of layers in p-n junction 208 (such as doped layers 210 and 212) have a precision of less than five atomic planes.

Note that layers 218 and 220 may not contribute to the modulation mechanism, and instead may be chosen to reduce the total absorption-induced insertion loss. Consequently, with proper selection of the doping levels, p-n junction 208 can have the same insertion loss as the p-n junction shown in FIG. 1 with several times higher tuning efficiency.

Figure 3:
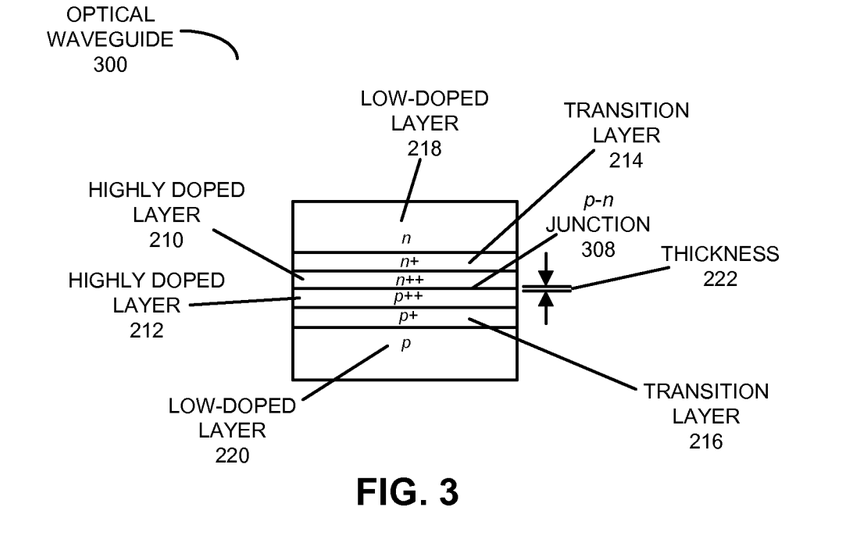
FIG. 3 is a block diagram illustrating a top view of a single-crystal regrown horizontal p-n junction in an optical waveguide in accordance with an embodiment of the present disclosure.
Figure 4:
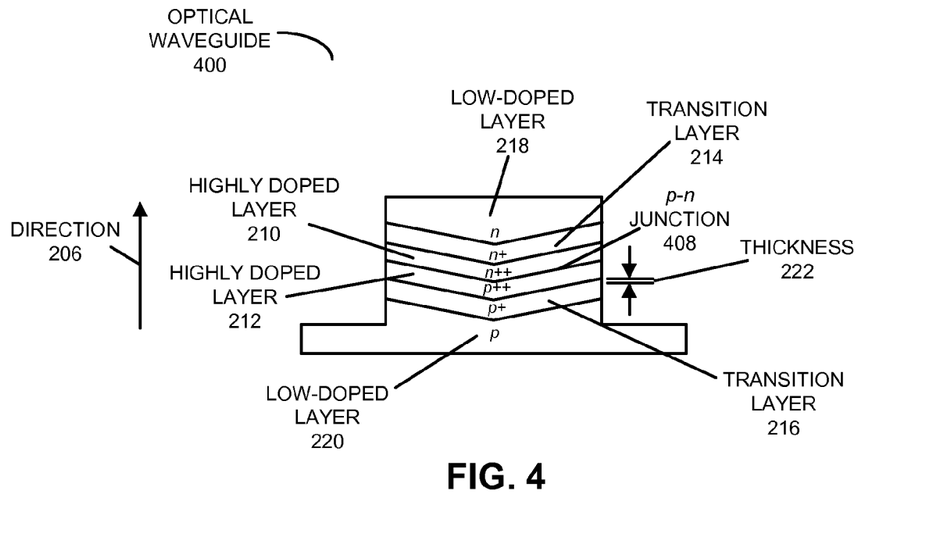
FIG. 4 is a block diagram illustrating a side view of a V-shaped single-crystal regrown p-n junction in an optical waveguide in accordance with an embodiment of the present disclosure.

While FIG. 2 shows a vertical p-n junction, in other embodiments the p-n junction is horizontal (i.e., in the plane of a semiconductor layer in the SOI wafer). This is shown in FIG. 3, which presents a block diagram illustrating a top view of a single-crystal regrown horizontal p-n junction 308 in an optical waveguide 300. Moreover, there may be one or more instances of the p-n junction in FIG. 2 or FIG. 3. In general, as more instances of a single-crystal regrown p-n junction or stack are included in a modulator, there is a tradeoff between the modulation efficiency and the capacitance (and, thus, the bandwidth) of a given drive voltage. In some embodiments, the p-n junction has a V shape. This is shown in FIG. 4, which presents a block diagram illustrating a side view of a single-V-shaped single-crystal regrown p-n junction 408 in an optical waveguide 400.

A variety of techniques may be used to fabricate a single-crystal regrown p-n junction. In one embodiment, thin silicon dioxide layers are deposited and patterned on a blank SOI wafer to open regions for implantation. Then, using the patterned silicon dioxide layer as a hard mask, the silicon layer is partially etched to a desired thickness. Moreover, a high-quality hydrogen-boride-based dry etch may leave the single-crystal silicon surface clean and defect-free, which is necessary for low-defect regrowth. After wafer cleaning, desired p-type and n-type layers may be regrown in the patterned openings. Next, the silicon-dioxide layer may be optionally removed, and the SOI wafer may undergo optional chemical-mechanical polishing (CMP) to smooth the surface. Note that this embodiment of the fabrication technique may preclude high-temperature processes (such as oxidation) because of dopant diffusion. Consequently, this embodiment of the fabrication technique may result in optical waveguides with reduced performance because of an absence of sidewall passivation and/or smoothing.

Figure 5:
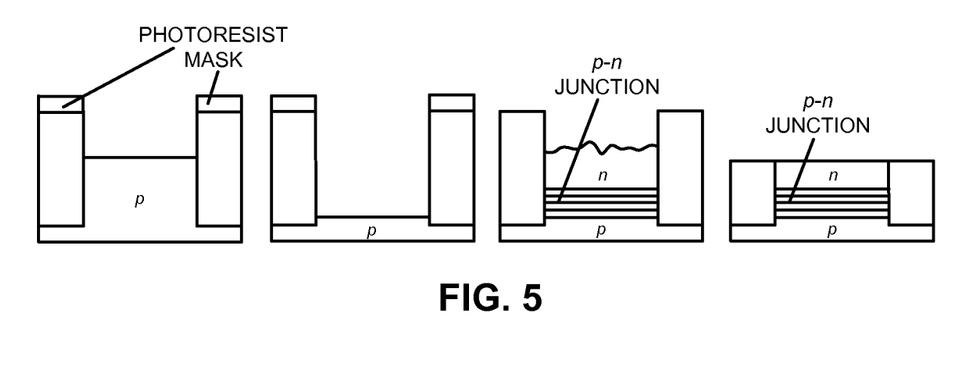
FIG. 5 is a drawing illustrating fabrication of a vertical single-crystal regrown p-n junction in accordance with an embodiment of the present disclosure.

Another embodiment of the fabrication technique is shown in FIG. 5, which presents a drawing illustrating fabrication of a vertical single-crystal regrown p-n junction. In particular, the fabrication technique shown in FIG. 5 may use an SOI wafer with etched optical waveguides after completion of high-temperature processes (such as oxidation, other-area implantation and annealing). Similar to the preceding embodiment of the fabrication technique, selective-growth areas may be patterned in the silicon-dioxide layer using a photoresist mask. Then, the silicon optical waveguide may be etched to the desired height (e.g., using a dry etch of the silicon-dioxide cladding and a partial dry etch of the silicon core). After the selective-area regrowth of the core to form the p-n junction, the SOI wafer may be polished by CMP to level the core layers back to the original height and to eliminate overgrowth. In this embodiment of the fabrication technique, note that the regrowth may originate from three rather than five silicon surfaces. Consequently, it may require accurate alignment during some of the operations in the fabrication technique, such as during the patterning in the silicon-dioxide layer using the photoresist mask.

Figure 6:
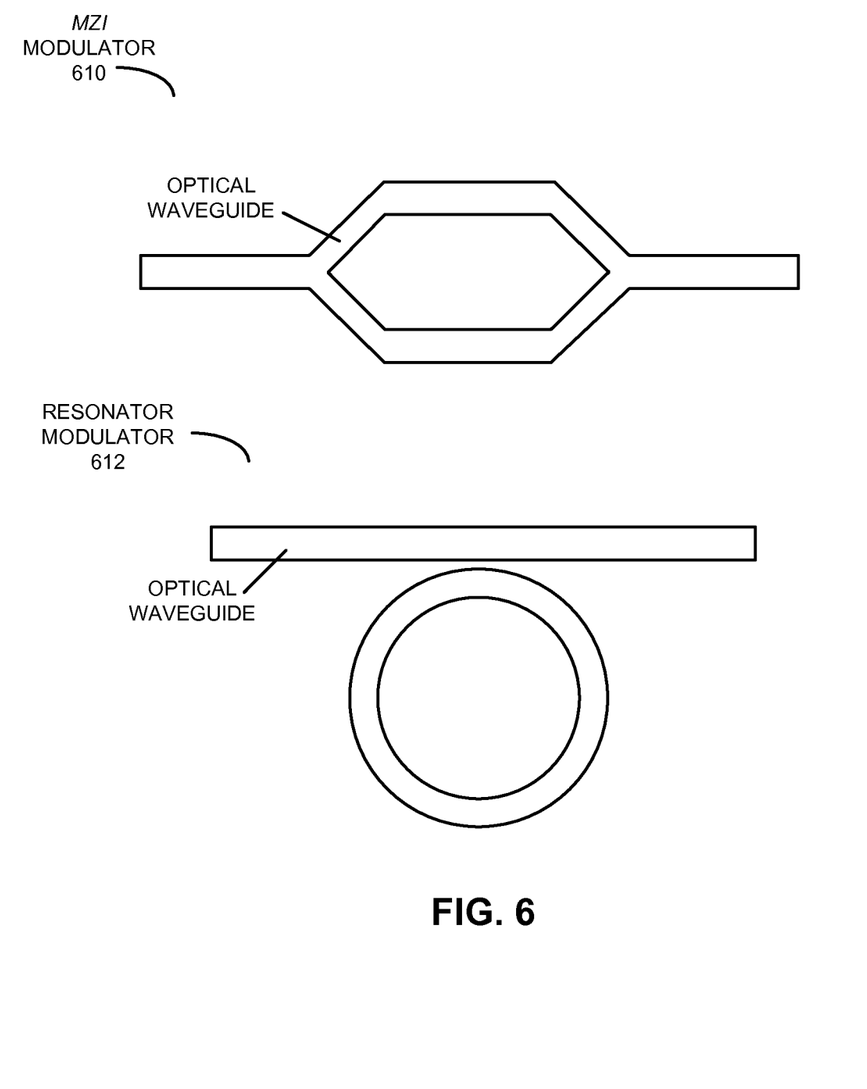
FIG. 6 is a block diagram illustrating a Mach-Zehnder interferometer modulator and a ring-resonator modulator in accordance with an embodiment of the present disclosure.

FIG. 6 is a block diagram illustrating an MZI modulator 610 and a resonator modulator 612, which may include one or more of the preceding embodiments of a regrown p-n junction. In particular, MZI modulator 610 and resonator modulator 612 may include optical waveguides with regrown p-n junctions. Note that either of these resonant devices transforms the phase change associated with the reverse bias of a p-n junction into a change in amplitude. In an exemplary embodiment, resonator modulator 612 may include: a ring-resonator modulator, a disc-resonator modulator, and/or a photonic-crystal resonator modulator.

Figure 7:
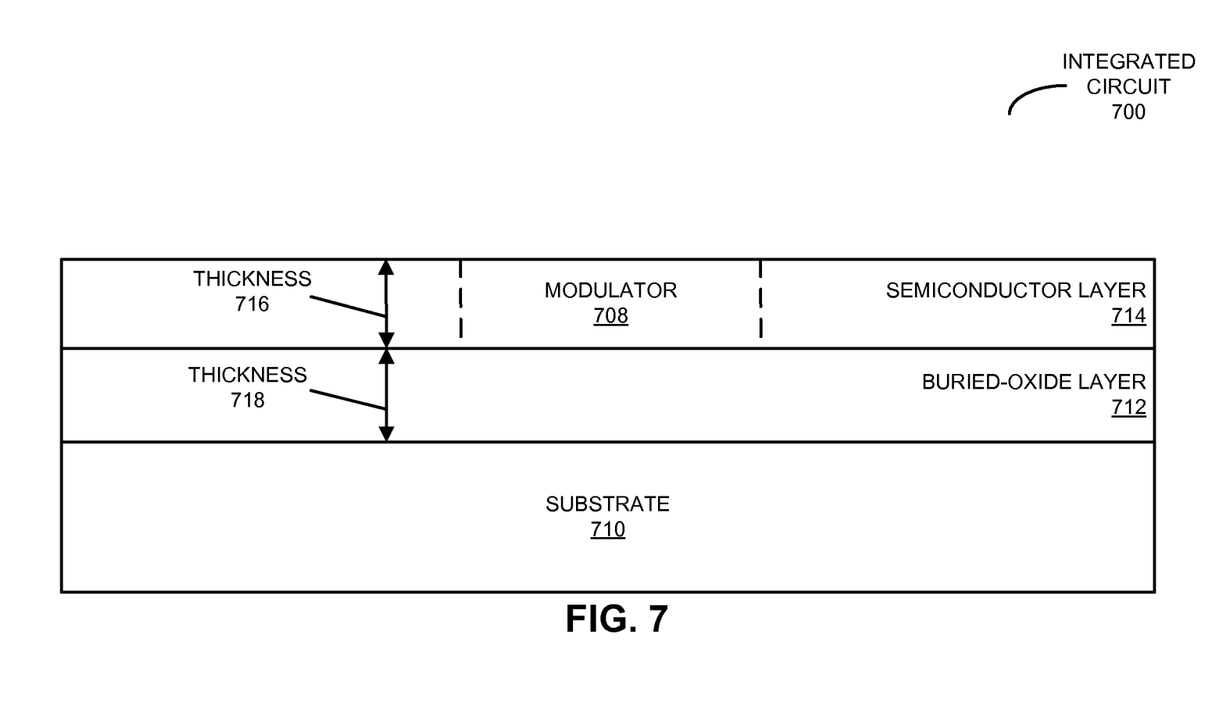
FIG. 7 is a block diagram illustrating a side view of an integrated circuit that includes a modulator with a single-crystal regrown p-n junction in accordance with an embodiment of the present disclosure.

The modulator may be implemented in an integrated circuit, such as a photonic integrated circuit. FIG. 7 presents a block diagram illustrating a side view of an integrated circuit 700 that includes a modulator 708 with a single-crystal regrown p-n junction. This integrated circuit includes: a substrate 710, a buried-oxide (BOX) layer 712 disposed on substrate 710, and a semiconductor layer 714 disposed on buried-oxide layer 712. Optical components in modulator 708 may, at least in part, be included in buried-oxide layer 712 and semiconductor layer 714. In an exemplary embodiment, substrate 710 and semiconductor layer 714 include silicon and buried-oxide layer 712 includes silicon dioxide. Thus, substrate 710, buried-oxide layer 712 and semiconductor layer 714 may constitute a silicon-on-insulator technology.

Moreover, semiconductor layer 714 may have a thickness 716 that is less than 1 μm (such as 0.2-0.3 μm). Furthermore, buried-oxide layer 712 may have a thickness 718 between 0.3 and 3 μm (such as 0.8 μm). Note that a width of the optical waveguides may be 0.25-3 μm. In an exemplary embodiment, the optical waveguides convey an optical signal (i.e., light) having wavelengths between 1.1-1.7 μm, such as an optical signal having a fundamental wavelength of 1.3 or 1.55 μm.

Figure 8:
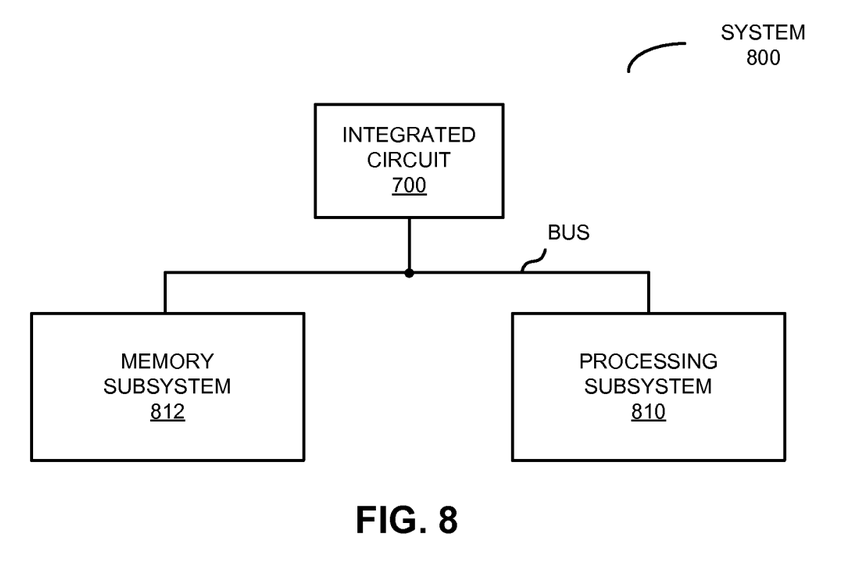
FIG. 8 is a block diagram illustrating a system that includes the integrated circuit of FIG. 7 in accordance with an embodiment of the present disclosure.

Integrated circuit 700 may be included in a system and/or an electronic device. This is shown in FIG. 8, which presents a block diagram illustrating a system 800 that includes integrated circuit 700. In some embodiments, system 800 includes processing subsystem 810 (with one or more processors) and memory subsystem 812 (with memory).

In general, functions of integrated circuit 700 and system 800 may be implemented in hardware and/or in software. Thus, system 800 may include one or more program modules or sets of instructions stored in a memory subsystem 812 (such as DRAM or another type of volatile or non-volatile computer-readable memory), which, during operation, may be executed by a processing subsystem 810. Note that the one or more computer programs may constitute a computer-program mechanism. Furthermore, instructions in the various modules in memory subsystem 812 may be implemented in: a high-level procedural language, an object-oriented programming language, and/or in an assembly or machine language. Note that the programming language may be compiled or interpreted, e.g., configurable or configured, to be executed by the processing subsystem.

Components in system 800 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 800 may be at one location or may be distributed over multiple, geographically dispersed locations.

System 800 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Note that a given computer system may be at one location or may be distributed over multiple, geographically dispersed locations.

Moreover, integrated circuit 700 can be used in a wide variety of applications, such as: optical communications (for example, in a transceiver, an optical interconnect or an optical link, such as for intra-chip or inter-chip communication), a radio-frequency filter, a bio-sensor, data storage (such as an optical-storage device or system), medicine (such as a diagnostic technique or surgery), a barcode scanner, and/or metrology (such as precision measurements of distance).

Furthermore, the embodiments of the electro-refraction modulator, integrated circuit 700 and/or system 800 may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the electro-refraction modulator, integrated circuit 700 and/or system 800 may be implemented more in hardware and less in software, or less in hardware and more in software, as is known in the art.

While the preceding embodiments have been illustrated with particular elements and compounds, a wide variety of materials and compositions (including stoichiometric and non-stoichiometric compositions) may be used, as is known to one of skill in the art. Thus, while a silicon optical waveguide was illustrated in the preceding embodiments, the modulation technique may be used with other materials (such as germanium and/or silicon germanium), as is known to one of skill in the art. Moreover, the semiconductor layer may include polysilicon or amorphous silicon. Furthermore, the materials and compounds in the electro-refraction modulator may be fabricated using a wide variety of processing techniques, including: evaporation, sputtering, molecular-beam epitaxy, wet or dry etching (such as photolithography or direct-write lithography), polishing, etc. In addition, a wide variety of optical components may be used in or in conjunction with the electro-refraction modulator.

Figure 9:
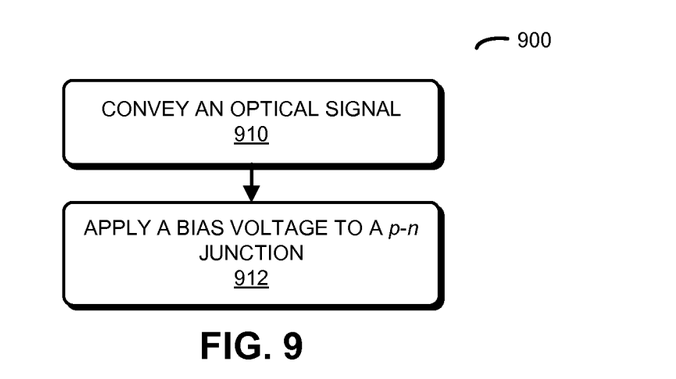
FIG. 9 is a flow chart illustrating a method for modulating an optical signal in accordance with an embodiment of the present disclosure.

We now describe embodiments of a method. FIG. 9 presents a flow chart illustrating a method 900 for modulating an optical signal, which may be performed by a modulator that includes one or more of the preceding embodiments of a single-crystal regrown p-n junction. During operation, the modulator conveys the optical signal (operation 910) in an optical waveguide defined in a semiconductor layer, where the semiconductor layer is disposed on a buried-oxide (BOX) layer and the BOX layer is disposed on a substrate. Then, the modulator applies a bias voltage to a p-n junction (operation 912) in the semiconductor layer.

Note that the p-n junction is included in a stack that includes: an outer n-type layer having a minimum n-type doping level, an intermediate n-type layer having an intermediate n-type doping level that is greater than the minimum n-type doping level, a junction n-type layer having a maximum n-type doping level that is greater than the intermediate n-type doping level, a junction p-type layer having a maximum p-type doping level, an intermediate p-type layer having an intermediate p-type doping level that is less than the maximum p-type doping level, and an outer p-type layer having a minimum p-type doping level that is less than the intermediate p-type doping level. Furthermore, a given layer in the instance of the stack is defined using single-crystal regrowth of the semiconductor layer.

In some embodiments of method 900, there may be additional or fewer operations. Moreover, the order of the operations may be changed, and/or two or more operations may be combined into a single operation.

The electro-refraction modulator may be used in a wide variety of applications, such as: communications, manufacturing (cutting or welding), a lithographic process, data storage (such as an optical-storage device or system), medicine (such as a diagnostic technique or surgery), a barcode scanner, entertainment (a laser light show), and/or metrology (such as precision measurements of distance).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
a substrate;
a buried-oxide (BOX) layer disposed on the substrate; and
a semiconductor layer, wherein the semiconductor layer includes an optical modulator;
wherein the optical modulator includes an instance of a stack including: an outer n-type layer having a minimum n-type doping level, an intermediate n-type layer having an intermediate n-type doping level that is greater than the minimum n-type doping level, a junction n-type layer having a maximum n-type doping level that is greater than the intermediate n-type doping level, a junction p-type layer having a maximum p-type doping level, an intermediate p-type layer having an intermediate p-type doping level that is less than the maximum p-type doping level, and an outer p-type layer having a minimum p-type doping level that is less than the intermediate p-type doping level; and
wherein a given layer in the instance of the stack is defined using single-crystal regrowth of the semiconductor layer.

2. The integrated circuit of claim 1, wherein the optical modulator includes one of: a resonator modulator, and a Mach-Zehnder modulator.

3. The integrated circuit of claim 2, wherein the resonator modulator includes one of: a ring-resonator modulator, a disc-resonator modulator, and a photonic-crystal resonator modulator.

4. The integrated circuit of claim 1, wherein a thickness of a p-n junction between the junction n-type layer and the junction p-type layer is smaller than a diameter of an optical mode in an optical waveguide in the semiconductor layer.

5. The integrated circuit of claim 1, wherein the semiconductor layer includes multiple instances of the stack.

6. The integrated circuit of claim 1, wherein the instance of the stack is along a vertical direction perpendicular to a plane of the semiconductor layer.

7. The integrated circuit of claim 1, wherein the instance of the stack is along a horizontal direction in a plane of the semiconductor layer.

8. The integrated circuit of claim 1, wherein the instance of the stack has a V shape.

9. The integrated circuit of claim 1, wherein the instance of the stack is defined without ion implantation.

10. The integrated circuit of claim 1, wherein boundary regions between pairs of layers in the instance of the stack have a precision of less than five atomic planes.

11. The integrated circuit of claim 1, wherein the maximum n-type doping level and the maximum p-type doping level are approximately $10^{19}/cm^3$, and the minimum n-type doping level and the minimum p-type doping level are approximately $10^{17}/cm^3$.

12. A system, comprising:
a processor;
a memory, coupled to the processor, that stores a program module, which, during operation, is executed by the processor; and an integrated circuit, wherein the integrated circuit includes:
  a substrate;
  a buried-oxide (BOX) layer disposed on the substrate; and
  a semiconductor layer, wherein the semiconductor layer includes an optical modulator;
  wherein the optical modulator includes an instance of a stack including: an outer n-type layer having a minimum n-type doping level, an intermediate n-type layer having an intermediate n-type doping level that is greater than the minimum n-type doping level, a junction n-type layer having a maximum n-type doping level that is greater than the intermediate n-type doping level, a junction p-type layer having a maximum p-type doping level, an intermediate p-type layer having an intermediate p-type doping level that is less than the maximum p-type doping level, and an outer p-type layer having a minimum p-type doping level that is less than the intermediate p-type doping level; and
  wherein a given layer in the instance of the stack is defined using single-crystal regrowth of the semiconductor layer.

13. The system of claim 12, wherein the optical modulator includes one of: a resonator modulator, and a Mach-Zehnder modulator.

14. The integrated circuit of claim 13, wherein the resonator modulator includes one of: a ring-resonator modulator, a disc-resonator modulator, and a photonic-crystal resonator modulator.

15. The system of claim 12, wherein a thickness of a p-n junction between the junction n-type layer and the junction p-type layer is smaller than a diameter of an optical mode in an optical waveguide in the semiconductor layer.

16. The system of claim 12, wherein the instance of the stack is along one of: a vertical direction perpendicular to a plane of the semiconductor layer; and a horizontal direction in a plane of the semiconductor layer.

17. The system of claim 12, wherein the instance of the stack is defined without ion implantation.

18. The system of claim 12, wherein boundary regions between pairs of layers in the instance of the stack have a precision of less than five atomic planes.

19. The system of claim 12, wherein the maximum n-type doping level and the maximum p-type doping level are approximately $10^{19}/cm^3$, and the minimum n-type doping level and the minimum p-type doping level are approximately $10^{17}/cm^3$.

20. A method for modulating an optical signal, comprising:
  conveying the optical signal in an optical waveguide defined in a semiconductor layer, wherein the semiconductor layer is disposed on a buried-oxide (BOX) layer and the BOX layer is disposed on a substrate; and
  applying a bias voltage to a p-n junction in the semiconductor layer, wherein the p-n junction is included in a stack that includes: an outer n-type layer having a minimum n-type doping level, an intermediate n-type layer having an intermediate n-type doping level that is greater than the minimum n-type doping level, a junction n-type layer having a maximum n-type doping level that is greater than the intermediate n-type doping level, a junction p-type layer having a maximum p-type doping level, an intermediate p-type layer having an intermediate p-type doping level that is less than the maximum p-type doping level, and an outer p-type layer having a minimum p-type doping level that is less than the intermediate p-type doping level; and
  wherein a given layer in the instance of the stack is defined using single-crystal regrowth of the semiconductor layer.

* * * * *